March 30, 1971   E. I. VALYI   3,573,003

COMPOUND METAL STRUCTURE

Original Filed June 14, 1962

INVENTOR.
EMERY I. VALYI

BY Robert H. Bachman

ATTORNEY

United States Patent Office 3,573,003
Patented Mar. 30, 1971

3,573,003
COMPOUND METAL STRUCTURE
Emery I. Valyi, Riverdale, N.Y., assignor to
Olin Corporation
Continuation of application Ser. No. 606,751, Jan. 3, 1967, which is a continuation-in-part of application Ser. No. 464,894, May 14, 1965, which is a division of application Ser. No. 398,128, Sept. 21, 1964, now Patent No. 3,289,750, dated Dec. 6, 1966, which is a division of application Ser. No. 202,612, June 14, 1962, now Patent No. 3,201,858, dated Aug. 24, 1965, which is a continuation-in-part of application Ser. No. 732,663, May 2, 1958, now Patent No. 3,049,795, dated Aug. 21, 1962, which in turn is a continuation-in-part of application Ser. No. 586,259, May 21, 1956. This application Nov. 7, 1969, Ser. No. 871,580
Int. Cl. B01j 9/04; B22f 3/10, 7/04
U.S. Cl. 23—288
5 Claims

ABSTRACT OF THE DISCLOSURE

The disclosure teaches a compound metal structure and a method for catalytically reacting two fluids. The improved structure comprises an impervious metal sheet, a porous body containing a material catalytic to chemical reactions, with the porous body being in surface contact with the impervious metal sheet. A first portion of the contacting surfaces of the impervious metal sheet and the porous body are bonded to each other. The compound metal structure further comprises conduit means defined by a portion of the impervious metal sheet.

This application is a continuation of U.S. patent application S.N. 606,751, filed Jan. 3, 1967, now abandoned, which in turn is a continuation-in-part of copending application Ser. No. 464,894, filed May 14, 1965, now abandoned, which in turn is a division of copending application Ser. No. 398,128, filed Sept. 21, 1964, now U.S. Pat. 3,289,750, granted Dec. 6, 1966. Said application Ser. No. 398,128 is in turn a division of copending application Ser. No. 202,612, filed June 14, 1962, now U.S. Pat. 3,201,858, granted Aug. 24, 1965, which in turn is a continuation-in-part of copending application Ser. No. 732,663, filed May 2, 1958, now U.S. Pat. 3,049,795, granted Aug. 21, 1962, which in turn is a continuation-in-part of copending application Ser. No. 586,259, filed May 21, 1956, now abandoned.

This invention relates to porous fabrications, and more particularly to a permeable body integrated to a supporting sheet metal structure adapted to conduct a fluid to the said permeable body for flow and distribution therethrough.

As brought out in the aforesaid copending applications, the subject matter thereof was directed to novel features wherein a permeable body formed of powdered metal is joined to a supporting metal structure so as to become integral therewith in all areas except where they are formed between the permeable and impervious portions of the structure.

The resultant porous fabrication may be utilized advantageously in various applications. For example, it may be employed in the subsequent manufacture of gas burners that are intended to provide evenly distributed heat over large surfaces. In such application a combustible gas is distributed by the fluid channels to different portions of the permeable body through which it flows to emanate on the combustion side thereof substantially uniformly over most of the surface of that body at a substantially uniform rate, thus producing a flame blanket. The resultant porous fabrication may also be utilized advantageously in the construction of evaporative coolers whereby an efficient cooling surface is obtained by using the porous metal body as a means through which to distribute over a large area the liquid which is to evaporate for the purposes of transpiration cooling. In a further application, the porous fabrication may be utilized in the construction of filters wherein the porous metal body provides a controlled porosity and permeability so as to enable a liquid carrier to filter through the porous metal body while leaving filtrate on the other side thereof. As will be recognized, one of the most important limitations restricting the use of porous fabrication resides in the fact that it is very difficult and costly to provide conduits which conduct fluids efficiently to the appropriate faces or portions of the porous metal bodies, and therefrom to be distributed into and through such porous metal bodies for the purposes of combustion, evaporation, filtration, or other purposes. Another limitation of porous metal bodies restricting their use in components designed to transfer heat from one medium to another derives from the fact that the heat conduction of such porous bodies is less than that of solid metal bodies and that it is difficult and costly to effect efficient heat transfer to the porous bodies and through them. While the techniques and methods of producing pervious or porous bodies from powder metal have been extensively discussed in the literature such as for example in "Powdery Metallurgy" by Dr. Paul Schwarzkopf (the MacMillan Company, New York, 1947) and "Powder Metallurgy" edited by John Wulff (the American Society for Metals, Cleveland, 1942), no economical and efficient method has been found thus far to overcome the limitations above referred to prior to the invention described in the aforesaid copending applications; the basic concept of the contribution therein comprises the forming of an integral structure of two or more metal layers of differing characteristics, of which at least one layer is porous and pervious to fluids, such as gases or liquids, and the others impervious and solid, these layers being secured together, preferably through a sintering operation, although brazing and other means may also be employed, so as to enable the formation of fluid channels in predetermined portions between the confronting faces of various layers comprising the integrated porous structure.

In accordance with the disclosure of the aforesaid copending applications, the porous fabrication is formed from a supporting sheet metal member which may have all or a portion thereof in the form of a flat, relatively thin plate, sheet, or strip. A pattern of weld-inhibiting material is applied to this member in a design corresponding to that desired for the fluid conducting channels which are to be provided in the ultimate structure. Following the application of the weld-inhibiting material, a susbtantial layer of powdered metal aggregate is deposited upon the plate thus treated. Subsequent thereto this composite structure may be subjected to pressure to compact the powdered metal and to press it firmly against the solid plate. This compacted assembly is then exposed to a suitable sintering temperature under conditions preventing undesired reactions, such as oxidation of the metal. This sintering operation accomplishes the sintering of the powdered metal particles to each other together with the metallurgical bonding, welding, of the sintered metal aggregate to the solid member.

In an alternate method disclosed in the foregoing copending applications, the powder metal layer may be separately formed by known powder metallurgy techniques. In this method the solid sheet metal member may be first prepared by applying a pattern of weld-inhibiting material to the portions thereof at which the fluid channels are to be formed, and applying to one side of the porous metal layer a suitable thin layer of soldering or brazing metal. The porous metal layer is then superimposed upon the solid plate so as to sandwich the weld-inhibiting material between them, and the composite subjected to a thermal treatment to accomplish the brazing or soldering of the porous metal layer to the sheet metal member in all adjacent areas thereof except in those portions, separated by the weld-inhibiting material.

The resultant composite structure may now be adapted for the conducting of fluids by deforming or flexing those portions of the sheet metal member, which are disposed opposite the weld-inhibiting material, away from the porous metal layer. This can be accomplished for example by introducing a fluid under pressure into the ununited portions of the composite structure formed between the porous layer and a sheet metal member, or mechanically, by insertion of suitable mandrels into these areas. This deformation of the sheet metal member away from the porous metal layer will form fluid channels defined on one side by an impervious metal wall portion and on the other side by the porous metal.

As will be understood, various combinations of materials may be utilized in forming the integrated composite structure; and accordingly the solid sheet metal member and the porous layer or body may be of the same metal or alloy, or the porous structure and the solid member, of the integrated structure, may be comprised of different compositions. For example, both the porous metal layer and a solid sheet metal member may be formed of the same stainless steels, coppers, brass, carbon steels, aluminum or various combinations thereof. As will be understood the ultimate use of the resultant integrated structure determines the specific combination of alloys to be employed.

Accordingly, among the objects of this invention is to provide a novel fluid permeable porous metal structure adapted to distribute a fluid and heat in flow therethrough.

Other objects and advantages of this invention will become more apparent from the following drawings and description in which.

Figure 1:
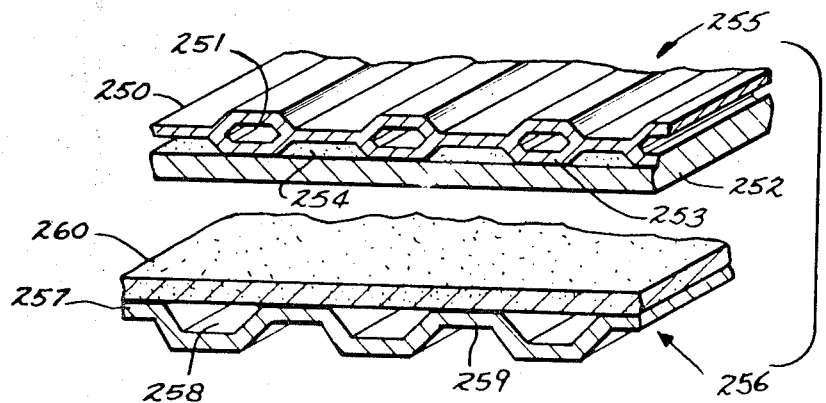
FIG. 1 is a perspective view, partly in section, showing one embodiment of the present invention.

Broadly, the compound metal structure of the present invention comprises:

(A) an impervious metal sheet;

(B) a porous body, preferably metallic, containing a material catalytic to chemical reactions, (1) said porous body being in surface contact with said impervious metal sheet, (2) a first portion of the contacting surfaces of said sheet and said body being bonded to each other, (3) with said body and said sheet preferably having other surfaces unbonded and cooperating to form channels extending therebetween; and (C) conduit means defined by a portion of said sheet.

In regard to production of the porous body, it may be obtained by the so called gravity sintering method which comprises a process wherein graded metal powder, frequently spherical metal powder, is poured by gravity into an appropriately shaped confined space, and usually vibrated to cause it to compact uniformly. As is obvious the choice of particle size of the metal powder will largely determine the amount of porosity, i.e., void space. The metal powder or aggregate so packed is then sintered in accordance with well-known powder metallurgy practices, producing a porous metal body whose bulk density, or apparent density, is but a fraction of the density of the metal or alloy from which the powder particles are obtained. Generally the conditions of vibration and conditions of sintering are chosen to result in an apparent density of approximately 25% to 75% of the solid density of the corresponding alloys. In another procedure for the production of such porous metal bodies the process may comprise blending intimately a graded metal powder with a combustible substance, such as for example wood flour or other organic particulate material, or a soluble material whose melting point exceeds the sintering temperature of the metal powder. After the formulation of this dry blend, the mixture of metal powder and combustible or soluble substance is then compacted under pressure, such as by rolling resulting in a body that has no voids and is reasonably firm, sufficient for handling. This body is then sintered in accordance with well-known powder metallurgy practices to produce a cohesive structure in which the metal particles are sintered together at their respective points of contact and the combustible or soluble material remains unbonded to the metal particles forming discrete islands within the metal body. Upon completion of the sintering operation and if the non-metallic component is combustible, then the resultant body will in fact contain void spaces everywhere previously occupied by the combustible material since the latter will have burned away in the course of sintering. In the case utilizing a soluble material whose melting point is higher than the sintering temperatures of the metal, the soluble material will remain intact after the final stages of sintering and can be subsequently removed by leaching and dissolving with a liquid, resulting in a network of interconnected pores.

In the modification of the foregoing it is noted the above described dry blend of metal powder and combustible or soluble substance may be replaced, respectively, by a paste or slurry obtained by suspending the admixed powder metal and combustible or soluble particles in a suitable liquid vehicle, as for example water or alcohol; or in applications where the combustible substance is mostly organic, by choosing a combustible substance that is a viscous liquid instead of being particulate such as for example a liquid phenolic resin. Alternately the mixture of metal powder and void or pore forming substance and vehicle, or void or pore forming substance alone, may be prepared into a paste which may be brought into the desired shape by pressing or extrusion.

A further method of producing the sintered porous metal bodies comprises melting a metal or alloy and casting it into the interstices of a porous aggregate of a particulate soluble material whose melting point exceeds that of the metal. Upon solidification of the metal, a component is produced which contains the network of the soluble material interspersed within the solid metal which soluble material is thereupon removed by leaching or dissolving, leaving behind it interstices that interconnect and form a porous network within the resultant metal body. Soluble substances contemplated for these purposes, be it for blending with solid metal powder or for the above casting process, comprise sodium chloride in conjunction with aluminum and aluminum alloys, aluminum fluoride in conjunction with copper alloys, and calcium oxide in conjunction with alloys having melting points higher than copper alloys. As will be understood other substances, particularly inorganic salts, are readily available and known to the art for such purpose as for example various phosphates, such as tri-sodium phosphate.

A still further method of producing a porous metal body comprises weaving or knitting metal wire into a mesh arranged in a plurality of layers. According to this process, a control of porosity is obtained by appropriate choice of wire diameters and openings arranged between adjoining wires as well as the juxtapositioning of superimposed layers of the woven or knit mesh.

Although a specific mass of sinterable metal has been described, it is pointed out that other formulations of sinterable materials may also be used, as for example those metal oxides, carbides and nitrides, or mixtures thereof, containing if necessary port or interstice forming materials discussed above. The unification of various components of this embodiment may be accomplished by sintering at temperatures sufficient to sinter the particulate substance within itself and to the sheet metal member in all regions in which the two bodies are in contact.

As will be understood, the selection of materials from which the porous and solid components are made to comprise the structures described herein and in the copending applications, is based on considerations within the skill of persons acquainted with mechanical, physical and chemical properties of materials. While the structures described herein have been identified as being metallic on numerous occasions, it is pointed out that all or parts of these structures may be made of non-metallic materials, as called for by their intended use. Thus, the porous layer may incorporate catalysts, which catalysts may be non-metallic. The porous layer may also consist in part or entirely of glasses, carbides, nitrides, oxides, or borides, for example in instances calling for heat resistance, corrosion resistance or insulating properties not available in metals and alloys. The porous layer may also consist of synthetic polymeric substances, for similar reasons, as for example sintered porous fluoro-carbon resins, silicone resins, and others. The solid component is usually made of metal strip or plate which may be coated with non-metallic materials of the kind referred to. In instances not calling for high strength the solid component may also be made of synthetic resins made into strip, sheet or plate stock.

Non-metallic components may be utilized. Thus, a component intended to distribute highly corrosive inorganic acid vapors may be made of fluorocarbon resins; another intended to serve as diffuser of combustible gas also acting as a radiant burner may be made in part of silicon carbide. Other examples are obvious to those skilled in the art of constructing components to be used in environments of high temperature and corrosive attack.

It will be understood that the porous layer referred to herein may be produced in still additional ways either in situ, upon the surface of a solid component or separately, to be joined thereto. Thus, the porous component may be produced by mechanical perforation of a solid metallic sheet, however, such a method would generally be expensive and cumbersome. The porous layer may also be produced by spraying of metal by techniques well-known to those skilled in the metal working art and carried out either with a wire gun or a powder gun, whereby, through appropriate and well-known adjustment of the spray gun, the spraying process may be directed so as to produce a porous sprayed deposit. A porous sprayed deposit may also be produced with a powder gun by spraying along with the material intended to form the porous layer and intimately intermingled with it an evanescent solid which will be deposited along with the rest of the sprayed material and which may then be removed from the porous composite by leaching as described in previous examples. However, this procedure of producing the porous layer by spraying is also cumbersome and expensive in most instances, compared to the other means described herein and in the copending applications.

As indicated above, the composite structures of this invention are adapted for many applications and particularly for use as heat exchangers. As is well known, tubular components used in heat exchangers were heretofore usually provided with fins, corrugations and other extensions of their surface so as to present an economic maximum extended surface area for a given weight of heat exchanger structure. However, such heat exchanger structures can be provided with greatly increased heat transfer surfaces by i.e. heat conductive bonding of a solid sheet metal unit to a sheet-like layer of sintered porous metal in accordance with any of the methods described heretofore. As has been discussed the sheet-like porous metal component is attached to the solid sheet metal unit by a metallic bond which will warrant good heat transfer with channels provided between the confronting faces of the components by interrupting the metallurgical bond in predetermined areas and in a predetermined pattern. These channels serve to conduct a fluid between the solid and porous layers with subsequent diffusion of flow through the porous body, thereby contacting the large surface area within the porous body, as defined by the innumerable insterstices extending between the integrated particles of the porous body. For example for application in refrigerator systems, where the solid sheet metal unit is internally laminated with its laminations distended into a system of fluid passageways, the fluid contained within the solid metal component may be water and the fluid contained within the channels may be liquid refrigerant or refrigerant vapor, as would be the case when such composite structures are used as refrigeration condensers or evaporators.

The compound metal structures of this invention find utility in many applications, as for example for providing means for reacting two or more fluid substances with each other. For example referring to FIG. 1, a solid sheet metal member 250 containing passageways 251 is joined by metallic bond such as described in the above copending applications to a porous sheet-like body 252 whereby the crests 253 represent the only areas in which the solid sheet metal member 250 and the porous sheet-like component 252 are in fact joined, thereby forming in the unjoined areas a network of channels 254 separating the solid and porous sheet-like members. It is evident that a first fluid may be caused to flow through passageways 251 and a second fluid may be caused to flow in the channel network 254 and thence to permeate the porous layers 252 flowing through it to the face of porous layer 252 opposed to the side joined to solid sheet metal member 250. It is also evident that in place of the solid sheet metal member 250 containing internally thereof fluid passageways 251, an uninterrupted solid sheet metal member may be provided without such passageways in which the channel network 254 is formed by suitable embossment of the solid sheet metal member.

For purposes of this description, the composite structure consisting of solid sheet metal component 250 and porous component 252 will be termed as composite panel 255 which in this apparatus is placed in substantially parallel face-to-face relationship, with another composite panel 256. Composite panel 256 comprises a solid sheet-like metal component 257 suitably embossed as to provide alternating channels 258 and crests 259. A porous sheet-like member 260 is joined to crests 259 with a metallic bond in the manner described in the copending applications.

Whenever required for the purpose to be described below, the present apparatus may contain a composite member 255 containing passageways in the solid component and another member 256 not containing such passageways as shown in FIG. 1, or alternately a pair of like composite members both being of the kind of composite member 255 or of composite member 256.

The two composite members 255 and 256 are arranged by conventional structural means not shown so as to maintain their relative positions and so as to confine the space between them within a box-like structure. For example, composite members 255 and 256 may form the top and bottom respectively of a boxlike structure having a rectangular cross-section, the width of which, coinciding with the width of composite members 255 and 256 may be four times larger or more than the height of side walls not shown, whose purpose it is to hold the two composite members in predetermined separation and in turn one-half or less of the length of the entire structure, it being noted that these dimensional relationships are intended to serve as an illustration only.

In use, a first fluid is caused to circulate in passageways 251 which fluid may have a closely controlled temperature which is to be imparted to composite structure 255 and through it to a second fluid which in turn is caused to flow through channels 254 into the porous layer 252 and through the latter into the space between the two composite members 255 and 256. A third fluid is caused to flow through channel network 258 contained within composite member 256 and to permeate porous layer 260 and flowing through it reach the same space confined between the two composite members 255 and 256. The second and third fluids being forced through their respective composite members at the same time will be caused to blend with each other intimately and very uniformly over the entire area in which the composite members 255 and 256 are juxtaposed. The rate of flow through the respective porous layers is controllable not only through the conventional means of valving but also through predetermined porosity of the respective porous layers and through the control of the back pressure reaching the channels 251 and 258 respectively in consequence of the flow resistance within the space that separates the two composite panels 255 and 256, that back pressure being dependent among other things upon the distance between the said composite panels which distances may be constant in any given apparatus or arranged to be variable by conventional mechanical or hydraulic means not shown.

The second and third fluids thus emerging under pressure from their respective composite members 255 and 256 will be intimately intermixed as aforedescribed and also forced to flow away at the same rate as fresh quantities of the respective fluids are entering into the supply channel network 251 and 258. Thus, a continuous transport of a blended mixture is established. The first fluid circulating in passageways 251 serves to control the temperature of the second fluid and, by virtue of the second fluid mixing into the third fluid, also the temperature of the resulting blend or mixture. If such temperature control is insufficient or if for reasons of safe and efficient intermixing of the second and third fluid, additional temperature control must be provided, then composite panels 256 may be made in the same manner as composite panel 255 to contain internal passageways within the solid sheet metal component for circulation of a fourth.

The apparatus here described is particularly useful in the continuous blending of fluids that enter into an exothermic reaction with each other, since in such an event the heat generated by the exothermic reaction may be carried away by a coolant circulated in passageways 251. Numerous reactions are known in the preparation of chemicals wherein two reactants, when brought into intimate contact react exothermically, i.e. under generation of heat, which heat in turn tends to accelerate the reaction to an undesirable degree. Such reactions could heretofore usually be carried out only in single batches whereas the apparatus here described will frequently render it possible to have such reactions take place in a continuous process, because of the greatly improved control of temperatures and rates of flow of the reactants and of the reaction products due to the improved heat transfer characteristics of the composite porous panels used and described.

Figure 2:
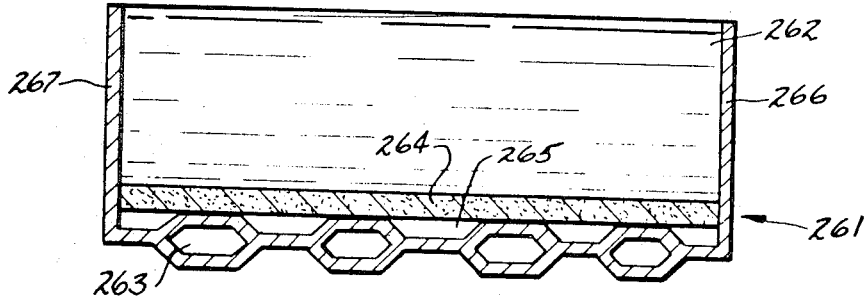
FIG. 2 is a sectional view showing an additional embodiment of the present invention.

FIG. 2 illustrates a still further aspect of this invention depecting an apparatus intended to fluidize a granular powdery or other particulate solid substance by permeating it with a suitable gas. Such fluidizing is well known in industry as for example described in a book by Donald F. Othmer entitled "Fluidization." Fluidizing is carried out for the purpose of conveying particulate solids for reacting gaseous fluids with particulate solids or for exposing a gaseous medium to the surface of solids, or for purposes of heating solid bodies by immersion, and for numerous other purposes. Fluidization takes place by causing the gas to penetrate uniformly into a mass of powdery, granular or other particulate solid material, at a pressure and rate sufficient to suspend each individual particle of the solid material upon a cushion of the respective gas. According to this invention, the device in which fluidizing is to take place consists of a composite member 261 made in accordance with any of the above-described methods by joining a solid sheet metal member 262 having internally thereof a pattern of fluid passageways 263 to a porous sheet-like member 264 in such a manner that intervening channels 265 are provided. The composite porous structure 261 is then made the bottom of a container or trough-like enclosure schematically indicated by its side walls 266 and 267 into which the particulate solid substance may be placed. The gas required for fluidization is then caused to flow in the channel network 265 to be distributed from it through the porous component 264 at a uniform rate over its entire surface area into the bed of particulate solids. The temperature of the said gas may in turn be controlled by a suitable heat transfer fluid circulating in passageways 263.

Figure 3:
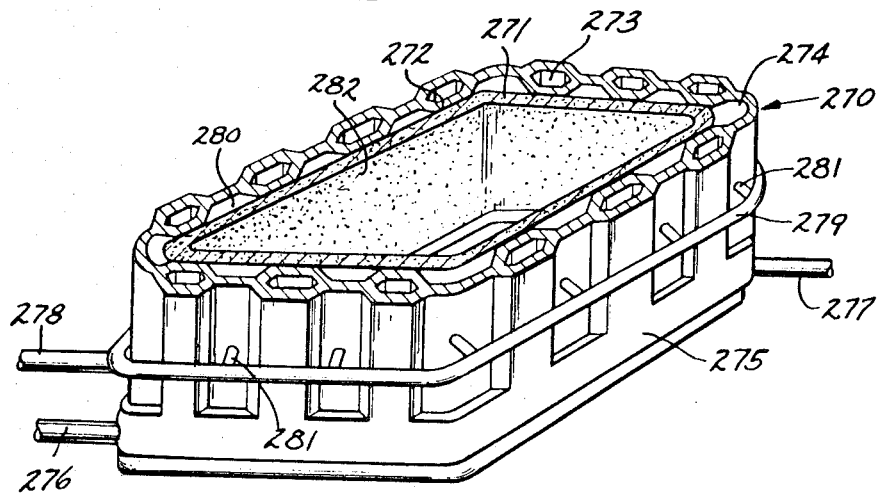
FIG. 3 is a perspective view, partly in section, showing an additional embodiment of the present invention.

A still further application of this invention may be seen in the embodiment depicted in FIG. 3 illustrating an apparatus employed as a chilled mold for continuous metal casting operations. It is known in continuous casting operations, such as copper and particularly steel, that the chill mold into and through which the metal is to be cast, is generally lubricated so as to prevent adhesion of the freshly chilled skin of the casting. Such adhesion is prevented by lubrication but also by mechanical means, such as by oscillation of the chill-mold and by vibration. Nevertheless it is very difficult to maintain steady and trouble-free operation, particularly in continuous steel casting, in supply lubricant. However, an effective means of supplying lubricant in such applications can be obtained by constructing a chill-mold in accordance with this invention, which is comprised of channeled porous overlay applied to a laminated and expanded solid stock. In the operation of such chilled dies it is contemplated to force-feed parting lubricants through the porous body and to circulate a cooling medium through the network of passages contained within the solid plate. As will be understood the pressure of the lubricant will preferably be regulated so as to produce equilibrium with the metallostatic head of the casting so that a stable separating film may be maintained.

In the specific embodiment illustrated in FIG. 3 a vertical open-ended mold 270 is fabricated from a composite formed in accordance with this invention of a porous overlay 271 metallurgically bonded to the crests 272 of the passageways 273 contained within a solid backing member 274 with the passageways interconnected together by means of a header 275 for a coolant which is supplied by means of an inlet tube 276 suitably mounted in communicating relationship with header 275, and withdrawn by a similar outlet tube 277. Lubricant is supplied to the mold by means of an inlet 278 into a manifold 279 from which it passes into channels 280 through a plurality of feeder tubes 281 mounted in suitable parts provided in the solid portions of the backing member 274. The pressurized lubricant is then force-fed from channels 280 through the porous overlay 271 onto the working face 282 thereof for its designed coaction with the ingot cast therebetween.

A similar application of this embodiment finds utility for lubrication of bearings normally referred to as oilless bearings which conventionally are normally merely impregnated with a suitable lubricant. However such conventional oilless bearings have the disadvantage in that the bearing is limited to the amount of lubricant which it may contain and which is available for supply to the bearing surface. Accordingly, conventional oilless bearings are used with this limitation in mind. However with the use of the composite structures of this invention, a continuous supply of lubricant can be supplied to a bearing surface by connecting the channeled porous body, of the composite, to a pressure supply of lubricant which is then caused to permeate through and be distributed by the porous layer to the bearing surface.

In an analogous manner an additional utility of this invention for application in chemical apparatus in order to react one or more highly corrosive substances with each other or wherein is produced through reaction of otherwise harmless substances a compound which in turn is highly corrosive. In such application the porous-solid composite of this invention can be used either to feed a separating substance, which does not enter into the reaction and does not affect its progress, so as to produce a neutral or inert separating and protective film at the walls of the vessel, or may also be used in cases where the reacting substances are in themselves harmless but the resulting substances which in turn will maintain a separating film.

The composite structure of this invention finds peculiar application for chemical reactions by forming or incorporating into the porous component a material catalytic to the reaction. As is well known many metals, as for example copper, nickel or iron as well as non-metallic material such as alumina, serve as catalysts in a variety of reactions for the production of chemicals. In most such reactions it is important for the substances to be reacted to come in contact with the catalyst at a uniform rate and with even distribution. In many of these reactions it is also necessary to preheat one or more of the substances which are to be reacted together; and frequently it is necessary to maintain certain pressures at predetermined periods of the reaction. Control is thereby desirably maintained over the rate of supply, the uniformity of distribution, the temperature, and the pressure of the reacting substances; and the rate of removal of the products.

The channels of the porous-solid composite structure of this invention lend themselves for close control of distribution of fluids and feed rates of fluids over large areas. And, as shown above, the composite structures also lend themselves to the construction of very efficient heat exchangers and heating devices. Accordingly, whether in combination or by themselves, these two uses of the channeled porous-solid composite structure of this invention may be further combined for use in catalytic reactions by incorporating into the porous component catalysts appropriate to the desired reaction. Thus, for example, in producing the composite structure, the powdered metal employed may incorporate a metallic or non-metallic catalyst in appropriate quantity. And, as will be appreciated, in case of exothermic reactions, it is possible to effect control of temperature by appropriate cooling, of the channeled porous component, by circulating a fluid through passageways provided within the solid component as described above. In like manner, when necessary, heating may be accomplished similarly.

A particular effective device can be constructed by placing in a manner similar to that shown in FIG. 1, two channeled porous-solid composites, of this invention, parallel to each other, with the porous components face-to-face, in close proximity. Assuming a reaction to take place between two fluids, one of these will be caused to flow through the channel network of one composite and the other fluid through the channel network of the second composite, with the fluids issuing in each case at faces of the porous components at a uniform rate and evenly distributed. Thus, there will be intimate mixing of the two fluids in the space between the composites, one or both of which may incorporate a catalyst, with provision for removal of the reaction product from between the composite, as for example by pumping for fluids; the reaction may proceed on a continuous bases aided, if necessary, by appropriate temperature as above mentioned. The flow of the reacted fluids may be turbulent, for more effective intermixing and heat transfer, by adjusting the rate of flow and through use of the rough powdered metal surface. As will be understood, such a device may be used with or without incorporating a catalyst into the porous component, as a convenient apparatus for reacting two or more fluids with each other.

Further, the composites of this invention are also applied for use in processes for catalystic cracking of crude oil wherein the oil must be preheated before entering the cracking tower. This is normally accomplished in so-called oil-heaters which are at present simply comparatively large diameter coils through which the oil is caused to flow. At the center of a coil of this kind, there is placed a single burner shooting a flame as high as the coil which is many feet high and the contents of the coil are then heated through convection and radiation from the luminous flame. This is of course a rather inefficient type of structure, in comparison to similar applications of this invention, i.e., a composite burner construction in the form of a tube with the coil caused to circulate through the center of the tube which is continued by appropriate piping spirally wound about the tube wherein the fuel is fed into the channels, between the porous and solid components, and burned at the surface of the porous component.

In the foregoing chemical application it is to be understood that porous and solid components may be of any suitable combination of material. Moreover, the porous component whenever used as a diffuser of gas or as an evaporator may be made as a composite of powdered metal and a catalyst to influence the reaction or made of a combined substance which not only serves as a permeable member but also influences the reaction in some way other than by catalysis.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:
1. A compound metal structure for catalytically reacting two fluids comprising:
   (A) an impervious metal sheet;
   (B) a porous body containing in addition as a separate component incorporated therein a material catalytic to chemical reactions,
      (1) said porous body being in surface contact with said impervious metal sheet and comprising a plurality of discrete metallic particles bonded together,
      (2) a first portion of the contacting surfaces of said sheet and said body being bonded to each other, and
   (C) conduit means defined by a portion of said sheet.
2. A compound metal structure according to claim 1 wherein said porous body and said sheet have surfaces unbonded to each other cooperating to form channels extending therebetween.
3. A compound metal structure according to claim 1 wherein said porous body is superimposed on said sheet, with a first portion of the confronting faces of said sheet and said body being metallurgically bonded to each other at their surface contacting points.
4. A compound metal structure according to claim 3 wherein a second portion of said confronting faces form channels extending between said confronting faces.
5. A compound metal structure according to claim 4 wherein said conduit means forms an imperforate separation between said conduit means and said channels.

References Cited
UNITED STATES PATENTS
2,361,854  10/1944  McCormack _____ 62—505
2,387,731  10/1945  Allen.
2,727,037  12/1955  Hochwalt.
2,742,505  4/1956  Brooke _____ 23—288X
2,847,284  8/1958  Busey _____ 23—288

JOSEPH SCOVRONEK, Primary Examiner

U.S. Cl. X.R.
29—182.3, 182.5; 75—208; 165—170, 180